US008235809B2

(12) United States Patent
Sugiyama et al.

(10) Patent No.: US 8,235,809 B2
(45) Date of Patent: Aug. 7, 2012

(54) GAMING MACHINE ALLOWING A PLAYER TO CHANGE THE VOLATILITY OF A GAME BASED ON AN AMOUNT OF PLAY HISTORY

(75) Inventors: Arata Sugiyama, Las Vegas, NV (US); Norio Tone, Las Vegas, NV (US)

(73) Assignee: Konami Gaming, Inc., Las Vegas, NV (US)

( * ) Notice: Subject to any disclaimer, the term of this patent is extended or adjusted under 35 U.S.C. 154(b) by 911 days.

(21) Appl. No.: 12/079,263

(22) Filed: Mar. 25, 2008

(65) Prior Publication Data

US 2009/0247284 A1 Oct. 1, 2009

(51) Int. Cl.
*G06F 17/00* (2006.01)
*G06F 19/00* (2011.01)
*A63F 9/24* (2006.01)
*A63F 13/00* (2006.01)

(52) U.S. Cl. ................. 463/29; 463/16; 463/20; 463/25

(58) Field of Classification Search ............. 463/16–20, 463/25, 29; 273/138.1, 139
See application file for complete search history.

(56) References Cited

U.S. PATENT DOCUMENTS

| | | | | |
|---|---|---|---|---|
| 6,110,041 | A * | 8/2000 | Walker et al. | 463/20 |
| 6,569,013 | B1 * | 5/2003 | Taylor | 463/13 |
| 7,374,485 | B2 * | 5/2008 | Mezen et al. | 463/20 |
| 2002/0086726 | A1 * | 7/2002 | Ainsworth | 463/16 |
| 2003/0078101 | A1 | 4/2003 | Schneider et al. | |
| 2004/0121833 | A1 * | 6/2004 | Mezen et al. | 463/16 |
| 2005/0043092 | A1 * | 2/2005 | Gauselmann | 463/36 |
| 2005/0282615 | A1 * | 12/2005 | Englman et al. | 463/20 |
| 2006/0030399 | A1 * | 2/2006 | Baerlocher | 463/20 |
| 2006/0046816 | A1 * | 3/2006 | Walker et al. | 463/13 |
| 2006/0084496 | A1 * | 4/2006 | Jaffe et al. | 463/20 |
| 2006/0281528 | A1 * | 12/2006 | Hall et al. | 463/20 |
| 2007/0060252 | A1 * | 3/2007 | Taylor | 463/16 |
| 2008/0113811 | A1 * | 5/2008 | Linard et al. | 463/42 |
| 2008/0242398 | A1 * | 10/2008 | Harris et al. | 463/25 |
| 2008/0274783 | A1 * | 11/2008 | Walker et al. | 463/13 |
| 2009/0088239 | A1 * | 4/2009 | Iddings et al. | 463/20 |
| 2010/0004047 | A1 * | 1/2010 | Acres | 463/20 |
| 2010/0016055 | A1 * | 1/2010 | Englman | 463/20 |
| 2010/0041461 | A1 * | 2/2010 | Demsetz et al. | 463/20 |
| 2010/0124969 | A1 * | 5/2010 | Hughes et al. | 463/20 |
| 2011/0045894 | A1 * | 2/2011 | Owen | 463/25 |

FOREIGN PATENT DOCUMENTS

WO WO2007/030670 A2 3/2007

OTHER PUBLICATIONS

Pachislot Hissyou Guide Magazine, Dec. 2007, p. 6, Byakuya-Shobo Co. Ltd., Tokyo, Japan.

(Continued)

*Primary Examiner* — Milap Shah
(74) *Attorney, Agent, or Firm* — Masuvalley & Partners

(57) ABSTRACT

The present invention is a gaming machine for playing a game and paying out an award according to play results, comprising a detector which recognizes a play history of a player, an analyzer which analyzes the play history, a controller which changes a volatility of the game according to the play history, and an initiator which initiates the game with changed volatility.

16 Claims, 16 Drawing Sheets

OTHER PUBLICATIONS

Pachislot Hissyou Guide Magazine, Aug. 2007, p. 117, Byakuya-Shobo Co. Ltd., Tokyo, Japan.
Pachislot Hissyou-hon Magazine, Aug. 2007, p. 124, Tatsumi Publishing Co., Ltd., Tokyo, Japan.
Examiner's first report on Australian Patent Application No. 2009200782, dispatched date Jun. 22, 2010, IP Australia.
Examiner's report No. 4 on Australian Patent Application No. 2009200782, dispatched date Jun. 23, 2011, IP Australia.

* cited by examiner

GAMING MACHINE ALLOWING A PLAYER TO CHANGE THE VOLATILITY OF A GAME BASED ON AN AMOUNT OF PLAY HISTORY

TECHNICAL FIELD

The present invention relates to a gaming machine that is, in general, widely used in a casino. The gaming machine of the present invention is characterized by changing a volatility of a game according to a result of analysis of a player's game history.

BACKGROUND OF THE INVENTION

Casinos have conventionally provided the same gaming machine to any players. There are various types of players in a casino, such as players who are frequent visitors to the casino, those who play a game for a long time, and those who are first visitors to the casino, and any of the players has been able to equally select a gaming machine, and play a game in an equal condition. However, there arise various problems in providing the same game content to all players although there are various players such as those who are winning the game, and those who are losing the game.

Also, functionality of a game provided by a gaming machine, and an operation required for a player by the gaming machine are monotonous, and consequently, the gaming machine tends to tire the player. Further, in some points such as story nature of a game, and images displayed according to a game, a variety of gaming machines are provided; however, there are not enough gaming machines having a new idea that does not tire a player, so that it is desired for such gaming machine having the new idea to appear.

SUMMARY OF THE INVENTION

An aspect of the present invention is a gaming machine for playing a game and paying out an award according to play results, comprising a detector which recognizes a play history of a player, an analyzer which analyzes the play history, a controller which changes a volatility of the game according to the play history, and an initiator which initiates the game with changed volatility.

The present invention can change the volatility of the game, and therefore does not tire the player even if monotonous progress of the game continues for a long time. Also, changing the volatility can make the game more active, and in some cases, provide the game with high or low gambling property. As a result, quality and fun of the game can be more improved. Further, the present invention can change the volatility of the game according to the play history, so that progress of the game can be differently provided to each of a plurality of different players, and therefore differentiation can be made. For example, for a player who has used a casino over a long period of time, a chance to win a high amount of award may be provided, or even for a player who is a first-time visitor to the casino, the high amount of award may be provided.

The controller may change a winning percentage of the player according to the play history.

By configuring the gaming machine as above, players who are suppose to win and those who are suppose to lose can be preassigned according to a difference in play history among the players, and the game can be conducted on the basis of the preassignment.

The controller may increase the number of symbol, picture or other design used in the game to pay out the award according to the play history. The controller may increase an appearance rate of symbol, picture or other design used in the game to pay out the award according to the play history.

By configuring the gaming machine as above, it can be arbitrarily determined whether a large or small number of specific symbols constituting a winning combination are displayed on reels, and for a player having a long play history, for example, the large number of specific symbols can be displayed to make the play more fun.

The controller may increase the number of winning combination type according to the play history.

By configuring the gaming machine as above, differentiation between, for example, frequent and infrequent players can be made if it is configured such that a winning combination by which, for example, the highest amount of award can be won is newly added, and only a specific player can use the winning combination to play the game.

The controller may change a payout rate according to the play history.

The gaming machine may be for playing the game including a progressive game and the controller increases an amount of award paid out in the progressive game.

By configuring the gaming machine as above, even in the progressive game, the volatility can be changed according to the play history, and features of the present invention can be applied to various game configurations.

The controller may increase a magnification ratio used for deciding the award. The gaming machine may be for playing the game, which includes a roulette displaying the magnification ratio.

By configuring the gaming machine as above, even in the progressive game or roulette game, the volatility can be changed according to the play history, and the features of the present invention can be applied to the various game configurations. Also, the magnification ratio can be set as an element to be changed according to the play history, and therefore the progress of the game can be made more wide-ranging.

If the volatility of the game is changed by specifically changing various game elements as described above, the player can enjoy a wide variety of games. Further, a game element meeting a player's preference can also be provided.

Another aspect of the present invention is a gaming machine for receiving a bet and paying out an award according to game results, comprising a recognizer which finds a play history of a player, a processor which configures a volatility of the game according to the play history, and an initiator which starts the game after configuring the volatility.

The present invention can change the volatility of the game, and therefore does not tire the player even if monotonous progress of the game continues for a long time. Also, changing the volatility can make the game more active, and in some cases, provide the game with high or low gambling property. As a result, quality and fun of the game can be more improved. Further, the present invention can change the volatility of the game according to the play history, so that progress of the game can be differently provided to each of a plurality of different players, and therefore differentiation can be made. For example, for a player who has used a casino over a long period of time, a chance to win a high amount of award may be provided, or even for a player who is a first-time visitor to the casino, the high amount of award may be provided.

The game may be configured with an element including a multiple-stage and the processor increases the number of the stage. The game may be configured with an element including a bonus game and the processor increases the number of bonus game type. The processor may provide another kind of game.

By configuring the gaming machine as above, in a game having the multiple-stage, bonus game, another kind of game having different characteristics, or the like, the volatility can be changed according to the play history, and the features of the present invention can be applied to the various game configurations. The game including the multiple-stage may be a game that a plurality of stages can be played in one game or that a player can select one stage of the multiple-stage. Since the player having a long play history is likely to prefer a high volatility, if the number of stage increases and an amount of award increases, the player is pleased to play the game.

Another aspect of the present invention is a method for producing a game and paying out an award according to game results, comprising the steps of recognizing a play history of a player, analyzing the play history, controlling a volatility of the game according to the play history, and initiating the game after controlling the volatility.

The present invention can change the volatility of the game, and therefore does not tire the player even if monotonous progress of the game continues for a long time. Also, changing the volatility can make the game more active, and in some cases, provide the game with high or low gambling property. As a result, quality and fun of the game can be more improved. Further, the present invention can change the volatility of the game according to the play history, so that progress of the game can be differently provided to each of a plurality of different players, and therefore differentiation can be made. For example, for a player who has used a casino over a long period of time, a chance to win a high amount of award may be provided, or even for a player who is a first-time visitor to the casino, the high amount of award may be provided.

The play history may be the amount of gaming time when the player has played in the past.

By configuring the gaming machine as above, a balance can be adjusted in terms of detriment over all players by providing a reasonable kickback or the like to a player playing the game for a long period of time.

The play history may be the number of game that the player has played in the past.

By configuring the gaming machine as above, the number of times a player visits a casino can be increased by returning a reasonable profit to a player who frequently visits the casino and making all players recognize the presence of such rule.

The play history may be the amount of money that the player has bet in the past.

By configuring the gaming machine as above, a balance can be adjusted in terms of detriment over all players by providing a reasonable kickback or the like to a player who has spent a large amount of money in a casino The game may be configured with an element including a bonus game and the play history is the number of bonus that the player has played in the past.

The game may be configured with an element including a free game and the play history is the number of free game that the player has played in the past.

By configuring the gaming machine as above, for a player who has experienced a bonus game or free game many times, the number of times the player will experience such game may be reduced to some extent.

The play history may be a play history during the predetermined term.

By configuring the gaming machine as above, a payment of a large amount of award, or the like, can be made only to a player who frequently visits a casino recently.

DETAILED DESCRIPTION OF INVENTION

Figure 1:
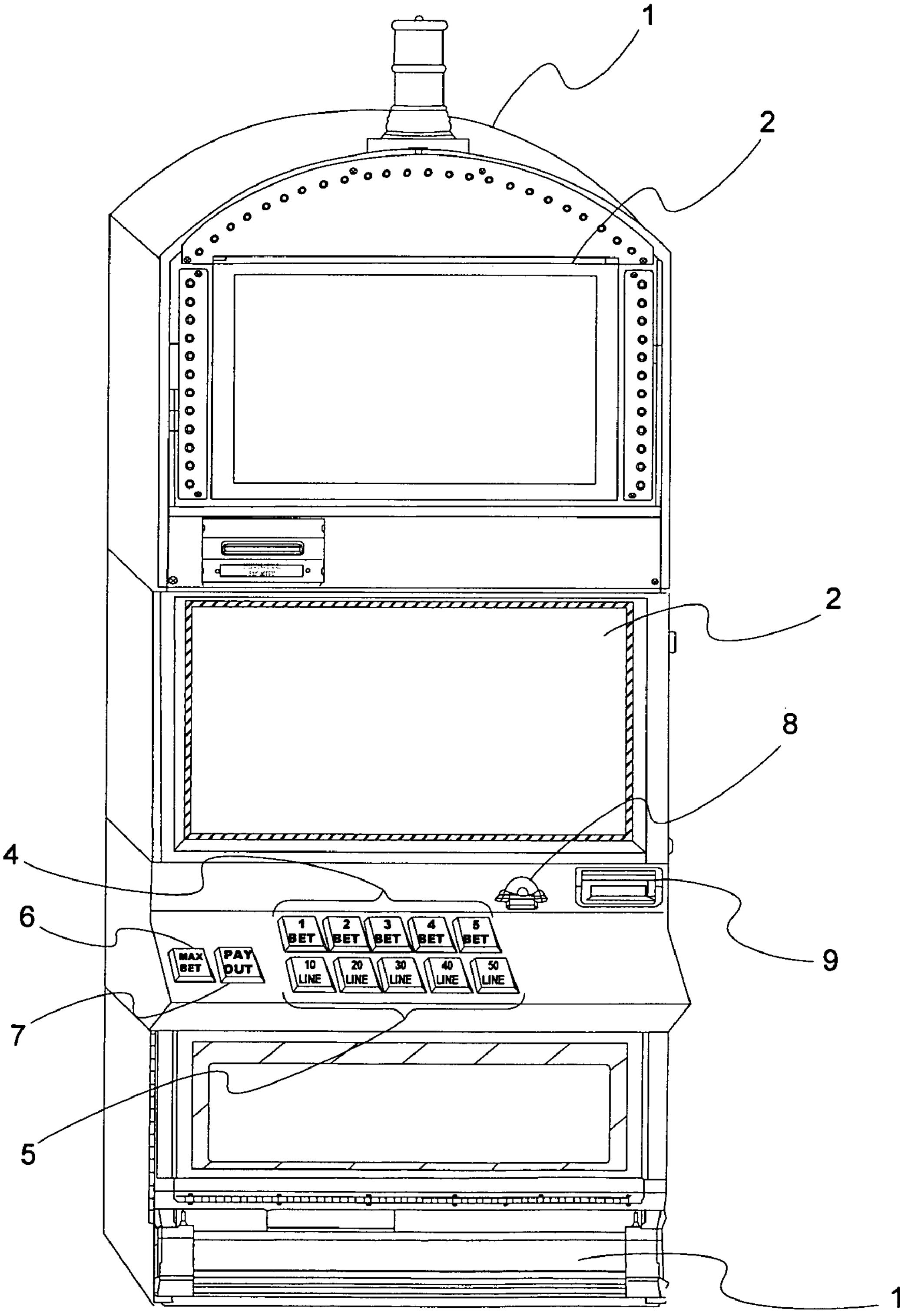
FIG. 1 is a perspective view illustrating an example of the gaming machine of the present invention.

FIG. 1 is a perspective view illustrating an example of the gaming machine of the present invention. As illustrated in FIG. 1, a gaming machine 1 comprises two displays 2. Just below the lower one of the displays 2, a BET switch 4, select switch 5, MAXBET switch 6, PAYOUT switch 7, coin slot 8, and inlet/outlet for banknote or the like 9 are provided. The BET switch 4 has five switches from "1BET" to "5BET". The select switch 5 has also five switches from "1select" to "5select". Further, a coin payout port 10 is provided at the bottom of the gaming machine 1.

The display 2 provides a display necessary for a player to play a game. For example, the display 2 provides a display for playing a primary game or a secondary game. Also, the display 2 displays, for example, cards used in a card game, a wheel and coins used in a roulette game, or reels and features used in a reel game. Further, the display 2 provides a display for the player to select the type of a progressive game or bonus game, or that for the player to select the feature. Alternatively, the display 2 may display a progressive game screen, or the like, on which an amount of money a player may win is displayed. Still alternatively, the display 2 may display presentation according to progress of a game, a credit being inputted into the gaming machine by the player, a play history of the player, or the like.

The BET switch 4 is a switch for putting a bet in a game. The player uses the BET switch 4 to put any of the bets from "1BET" to "5BET" for a single play of the game. The select switch 5 is a switch for selecting, for example, a card the player would like to discard, a line on reels, or the like. The numbers of switches included in the BET switch 4 and select switch 5 are not limited to five, respectively, but may be any numbers. Alternatively, the gaming machine 1 may have, for example, a switch for betting "10BET", or a switch for "10select".

The MAXBET switch 6 is a switch for putting the maximum bet that the player can bet on a single play of the game. The PAYOUT switch 7 is a switch for paying an amount of money credited to the gaming machine back to the player. The coin slot 8 is a hole for the player to credit coins to the gaming machine. The inlet/outlet for banknote or the like 9 is a hole used for inserting a banknote or cash card into the gaming machine, or for paying back an amount of credited money. The coin payout port 10 is intended for paying the amount of money credited to the gaming machine back to the player.

The gaming machine according to the present invention is not limited to the above, but may comprise various functions in addition to the above, or omit some of the above functions. For example, the gaming machine may have a lighting device for lighting the gaming machine with one or more different colors when the player enters a secondary game. Alternatively, the gaming machine may have a device for vibrating the entire game machine or outputting music when the player enters the secondary game. Still alternatively, the gaming machine 1 may have three or more displays. Yet alternatively, the gaming machine 1 may have a switch for again selecting "BET" the player bet on a previous play of the game.

Also, a reel, wheel, or the like used in the game is not necessarily displayed on the display, and the gaming machine 1 may be loaded with a stepper (mechanical reel), mechanical wheel, or the like. Further, there may exist a display used for a plurality of gaming machines in common.

The gaming machine of the present invention is characterized by analyzing a play history of a player to play a game, and changing a volatility of the game according to a result of the analysis. The "volatility" is a term commonly used in a game industry, and refers to digitalized impact of winning in the game. A game having a high volatility includes a game of a high-risk-high-return type, and that having a low volatility includes a game of a low-risk-low-return type.

The play history that is a factor for changing the volatility of a game may be any type of history. The play history may be determined on the basis of data on a game the player has played, such as an amount of time, the number of plays, type of game, or the number of days. Alternatively, the play history may be determined on the basis of data on a primary game the player has played, such as the number of plays, type, or time length. Still alternatively, the play history may be determined on the basis of data on a secondary game such as a bonus game the player has played, such as the number of plays, type, or time length. Yet alternatively, the play history may be determined on the basis of, for example, the number of days, or a period of time during which the player keeps winning or losing.

Also, the play history may be determined on the basis of, for example, an amount of money having been spent for a game by the player, a time length during which the player has not won any award, the number of times the player has entered a certain place such as a casino, or the like. Alternatively, the play history may be determined on the basis of a total amount of awards, or items the player has won. Upon determination of the play history on the basis of such element as described above, the element for the case where the player played only with a specific gaming machine, or the player played only for a specific period of time may be taken into account. Alternatively, upon determination of the play history, any combination of the elements as described above may be taken into account.

A method for the gaming machine to recognize a play history of a player may be any one. It may be configured such that if the play history is stored in the gaming machine or other device, the player is identified with the use of, for example, a player card, game ticket, biometric authentication, or the like, and the play history of the player is detected from the device. For the biometric authentication, a biometric authentication device (such as a fingerprint authentication device, face collation device, palm shape authentication device, iris authentication device, vein authentication device, voice authentication device, or any of the other various types of biometric authentication devices) capable of taking in physical features of the player may be used. Alternatively, it may be designed such that the play history is stored in some medium such as a memory stick, and if the player accesses to the gaming machine with the use of the medium, the gaming machine recognizes the play history stored in the medium.

Figure 2:
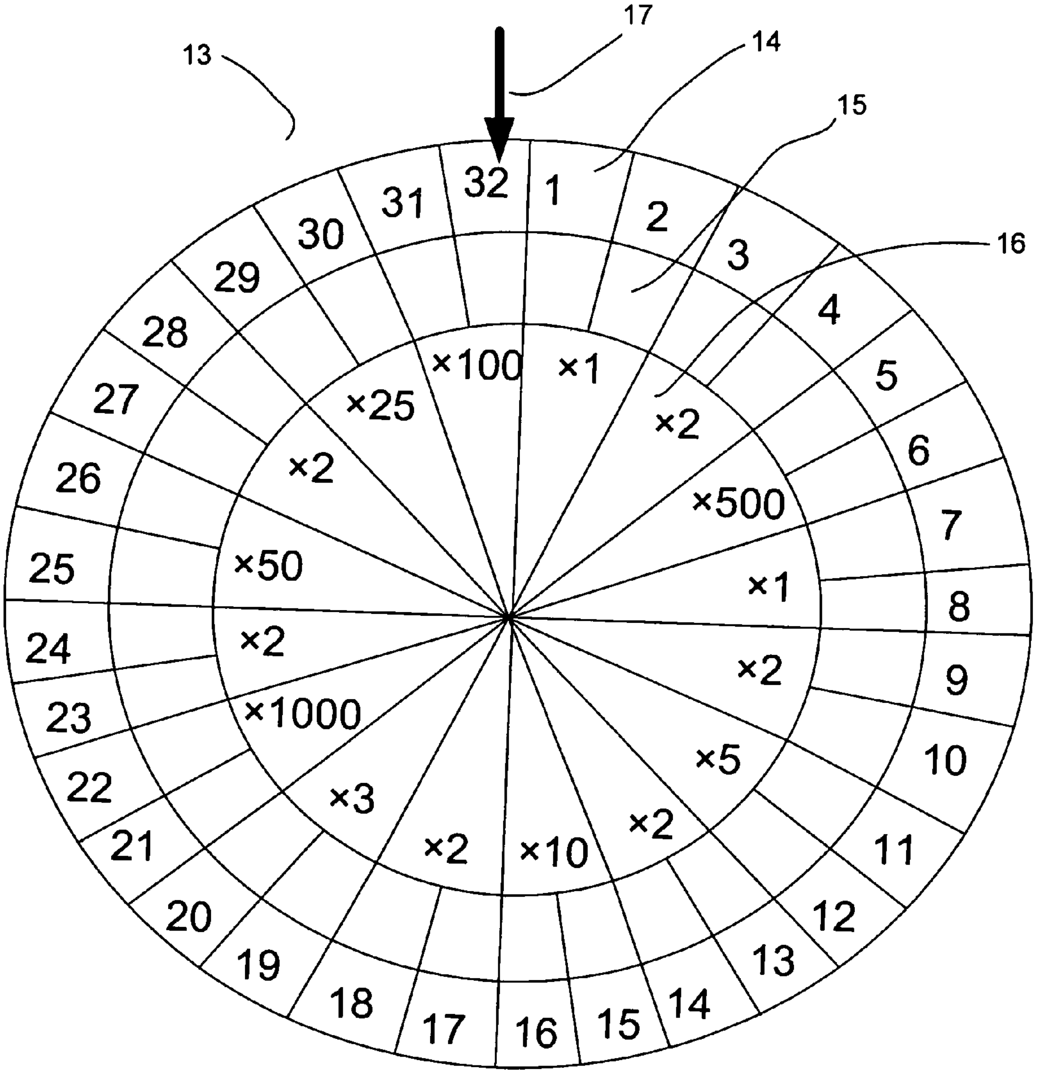
FIG. 2 is a diagram illustrating an example of a change of a magnification ratio in a roulette game.
Figure 3:
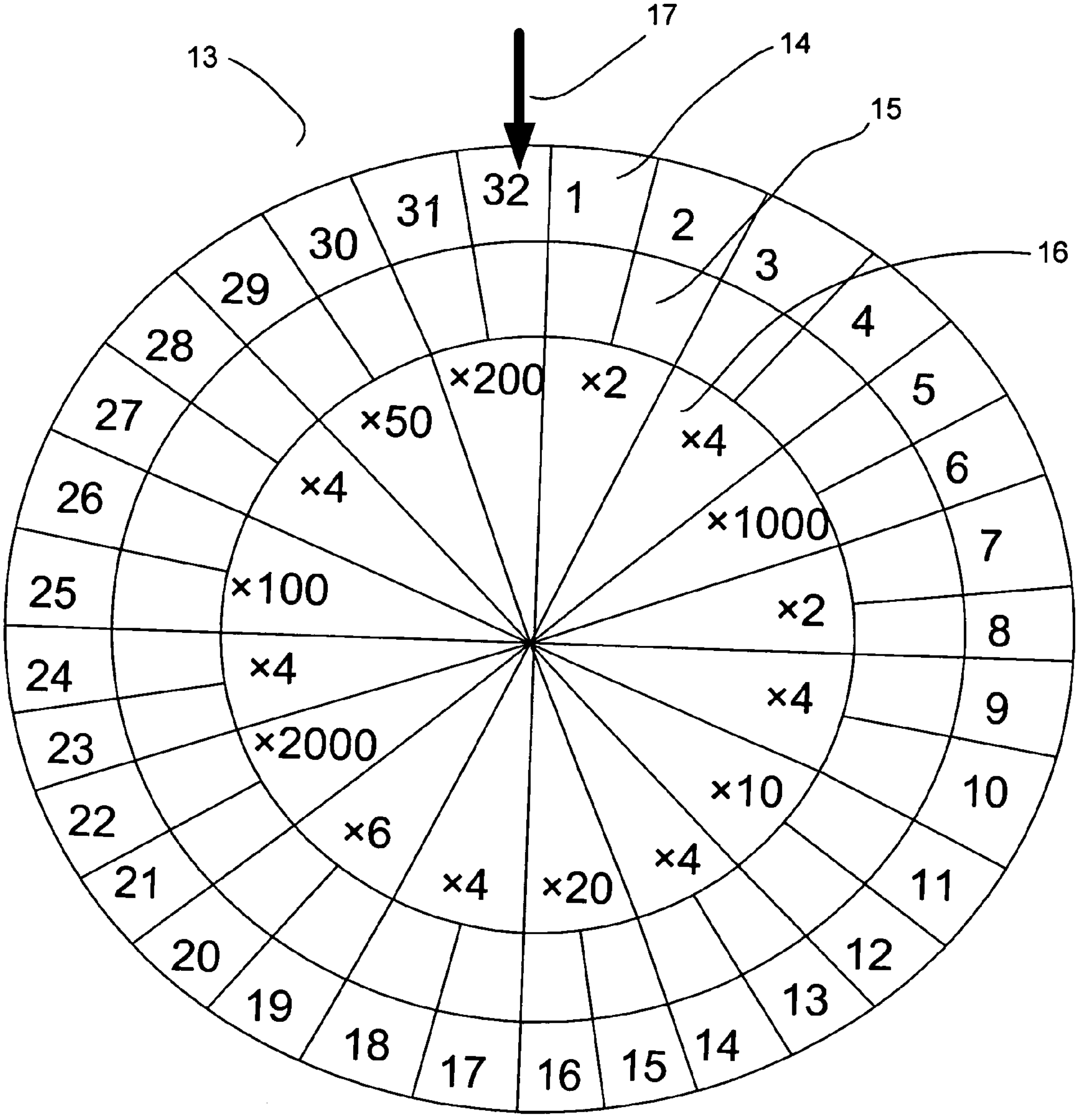
FIG. 3 is a diagram illustrating the example of a change of a magnification ratio in a roulette game.

Hereinafter, how the volatility of a game is changed according to the play history is described with specific examples being provided. FIGS. 2 and 3 are diagrams illustrating an example of a change of a magnification ratio in a roulette game. In FIG. 2, a wheel 13 and an arrow 17 are illustrated. The wheel 13 has an outer frame 14, middle frame 15, and inner frame 16. Within the inner frame 16, magnification ratios by which an award amount separately won by a player may be multiplied are displayed. An amount derived by multiplying the award amount separately won by the player by any of the magnification ratios indicated by the arrow 17 after rotation of the wheel 13 followed by stop of it may be set as a total award amount to be won by the player.

FIG. 3 illustrates a state where the magnification ratios displayed on the wheel of FIG. 2 are all doubled as a result of analyzing the play history and applying a result of the analysis to the game. The player can play the roulette game with the magnification ratios on the wheel being doubled.

Figure 4:
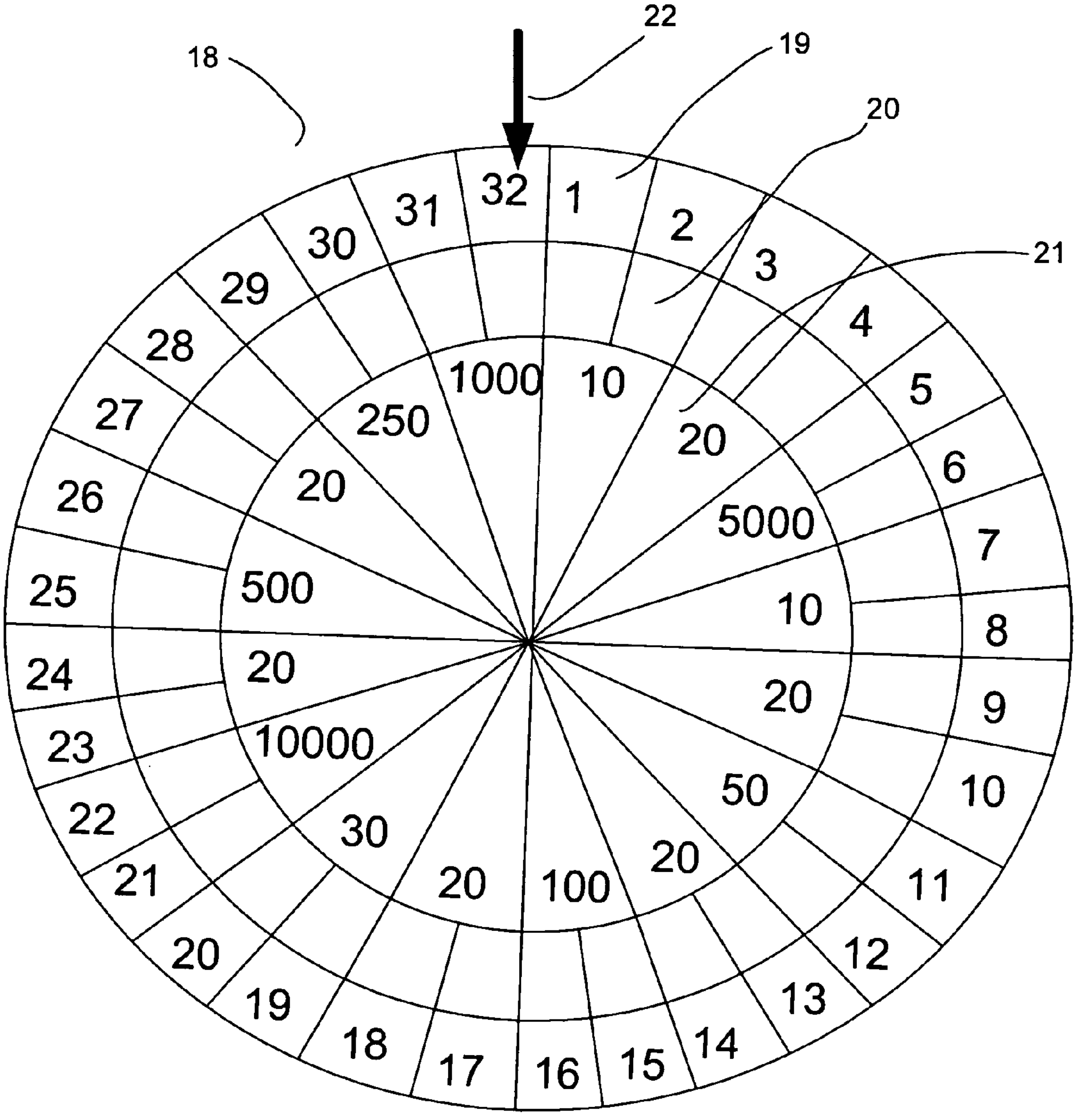
FIG. 4 is a diagram illustrating an example of a change of an award amount that may be won in a roulette game.
Figure 5:
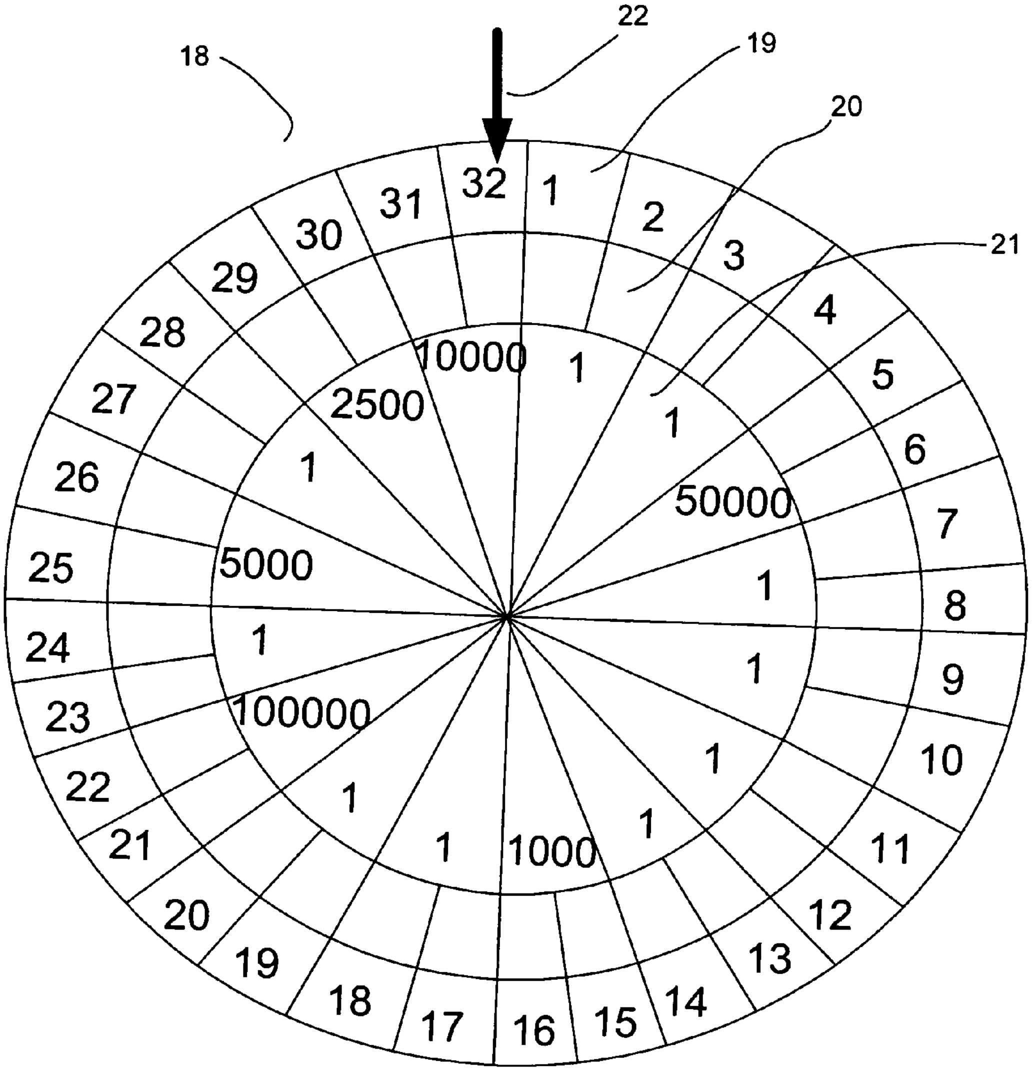
FIG. 5 is a diagram illustrating the example of a change of an award amount that may be won in a roulette game.

FIGS. 4 and 5 are diagrams illustrating an example of a change of an award amount to be won in a roulette game. In FIG. 4, a wheel 18 and an arrow 22 are illustrated. The wheel 18 has an outer frame 19, middle frame 20, and inner frame 21. Within the inner frame 21, award amounts the player may win are displayed. This is a game where the player can win an award amount displayed in a place indicated by the arrow 22 after rotation of the wheel 18 followed by stop of it.

FIG. 5 illustrates a state where the award amounts displayed on the wheel of FIG. 4 are changed as a result of analyzing the play history and applying a result of the analysis to the game. As can be seen from FIGS. 4 and 5, increased award amounts and decreased award amounts are both present. As illustrated, for the increased award amounts, the amounts are significantly increased, whereas for the decreased award amounts, the amounts are significantly decreased, and then the game having such high gambling property may be provided to the player. On the other hand, as described with FIGS. 2 and 3, by uniformly increasing or decreasing the magnification ratios or award amounts, the gambling property of the game may be increased or decreased. The increase or decrease rate of the award amounts or magnification ratios may be set in any manner.

Figure 6:
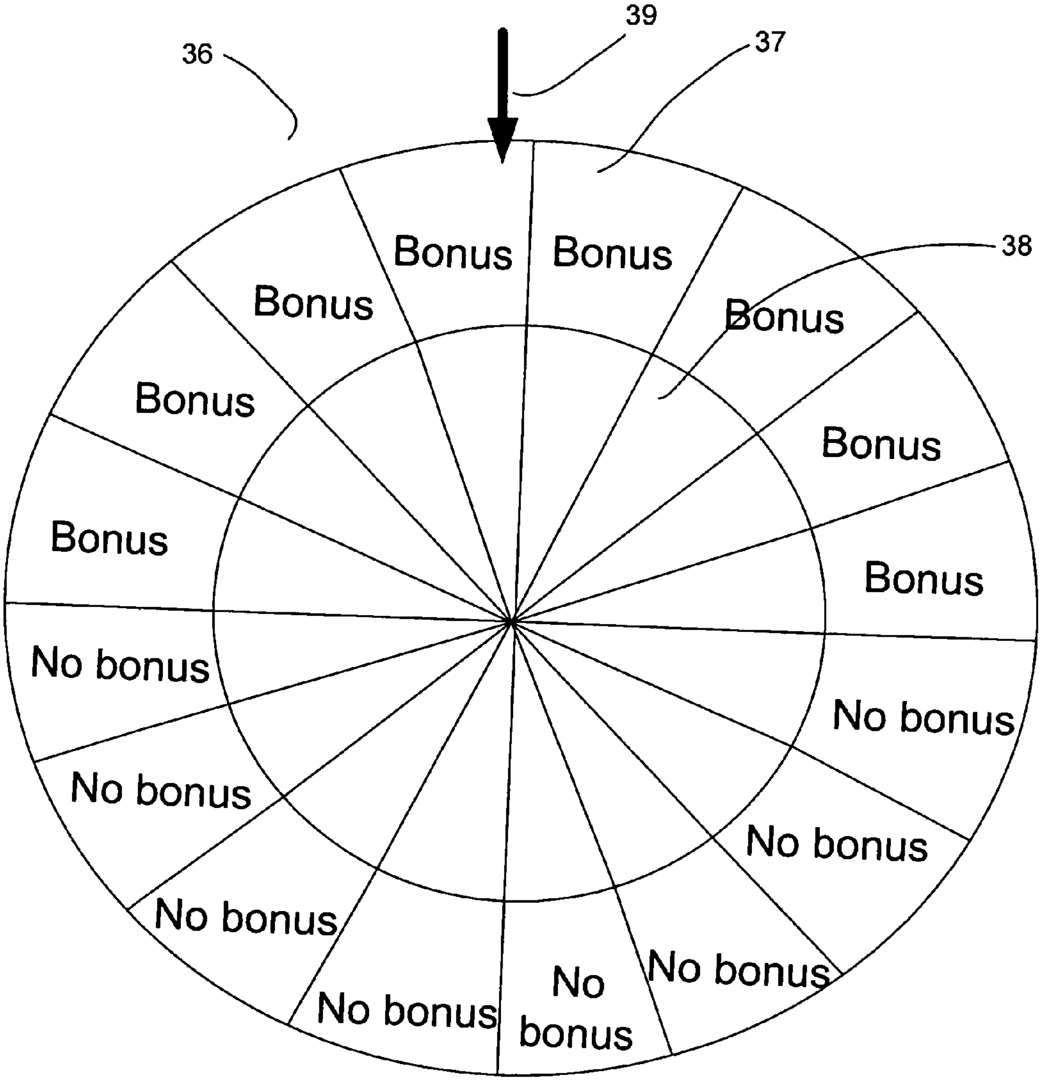
FIG. 6 is a diagram illustrating an example of a change of a bonus winning probability in a roulette game.
Figure 7:
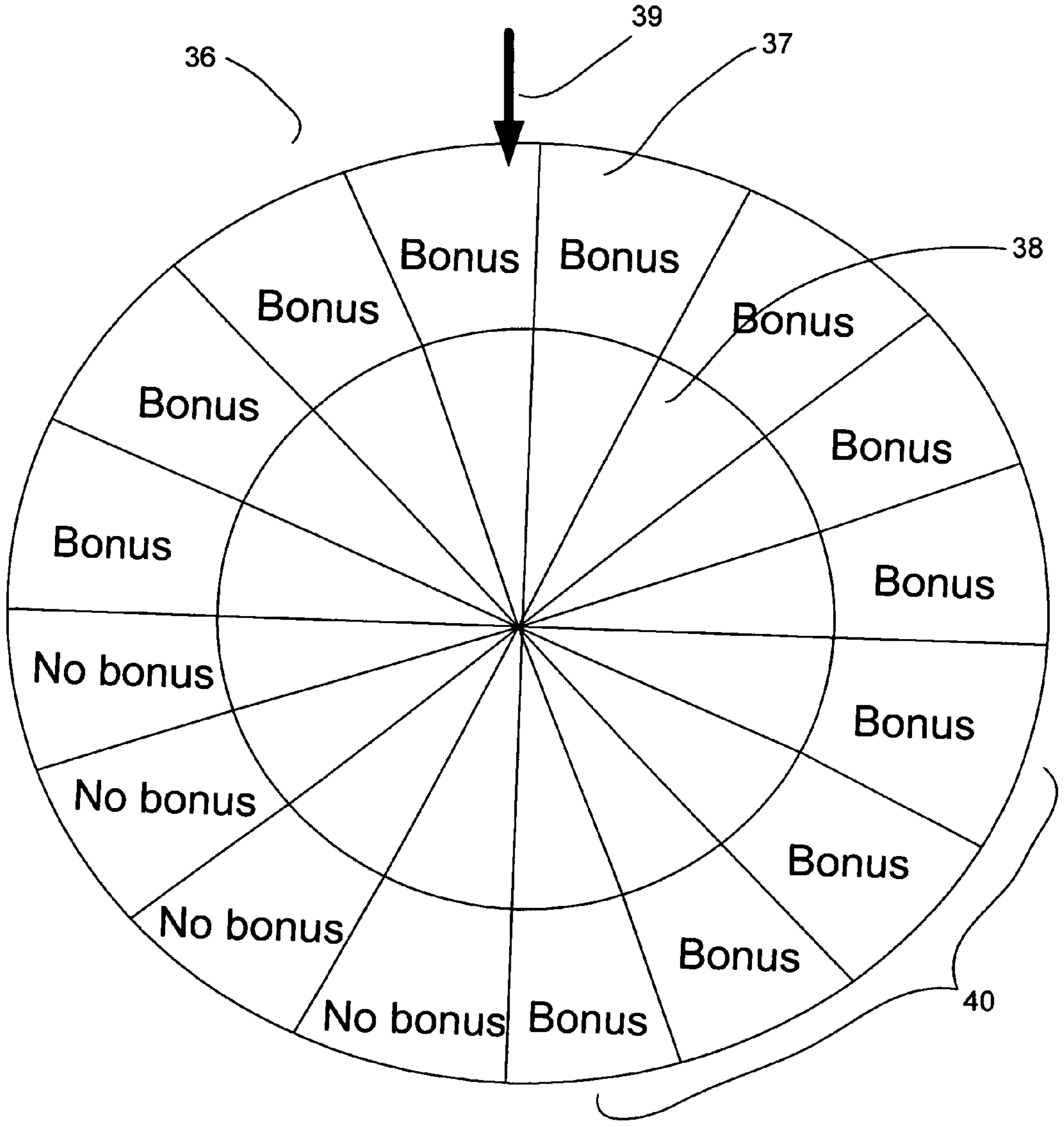
FIG. 7 is a diagram illustrating the example of a change of a bonus winning probability in a roulette game.

FIGS. 6 and 7 are diagrams illustrating an example of a change of a bonus winning probability in a roulette game. In FIG. 6, a wheel 36 and an arrow 39 are illustrates. The wheel 36 has an outer frame 37 and an inner frame 38. Within the outer frame 37, "Bonus" and "No bonus" displays are provided. If a place indicated by the arrow 39 after rotation of the wheel 36 followed by stop of it represents "Bonus", the player can play a bonus game. On the other hand, if a place indicated by the arrow 39 represents "No bonus", the player cannot play the bonus game.

FIG. 7 illustrates a state where a ratio, in number, of the "Bonus" or "No bonus" display displayed on the wheel of FIG. 6 is changed as a result of analyzing the play history and applying a result of the analysis to the game. As can be seen from the comparison between FIGS. 6 and 7, a lower right portion 40 of the wheel illustrated in FIG. 7 is changed from "No Bonus" to "Bonus" in terms of display. In FIG. 7, because the ratio of the "Bonus" display is increased, a probability that the player can play the bonus game is increased. The increase or decrease rate of the ratio of "Bonus" display may be set in any manner.

The roulette game of the present invention is not limited to the ones described with FIGS. 2 to 7, but may be any one. For example, a method for changing the volatility of the game may be any one. For example, it may be configured such that some sort of probability such as a player's winning percentage is displayed on the wheel, and the probability is increased or decreased. Alternatively, it may be configured such that symbols are displayed on the wheel, and the number of the symbols is increased or decreased. Still alternatively, it may be configured such that "Winning", "Go to bonus game", and "Losing" displays are present in sections of the wheel, and the numbers of them are decreased or increased. Also, it may be configured such that the respective sections of the wheel have colors, and a combination of the colors is changed. Further, the number of sections of the wheel may be increased or decreased. Still further, the number of wheels may be increased, for example, from one wheel to two or three wheels. On the other hand, the number of wheels may be decreased. Alternatively, the number of tools (e.g., arrow, ball, lighting, etc.) for selecting the section of the wheel may be increased or decreased. Also, a rotation speed of the wheel may be increased. This makes it difficult for the player to perform a wheel stop operation; however, such difficulty is acceptable. On the other hand, the rotation speed of the wheel may be decreased. This makes it easy for the player to perform the wheel stop operation; however, such easiness is acceptable. Two or more of the above-described changes may be introduced in one play of the roulette game. Such changes are not necessarily introduced at the same time, but may be introduced at different times.

Also, for example, the wheel may have a frame in addition to the outer, middle, and inner frames. The wheel may have, for example, four or more frames, and two outer, middle, or inner frames may be present. Also, within each of the frames of the wheel, anything may be displayed. For example, a graphic, picture, numeral, symbol, or the like may be displayed in the frame of the wheel. On the other hand, within each of the frames of the wheel, nothing may be displayed. Also, no inner frame of the wheel may be present, and the wheel may be of a shape in which a central portion of the wheel is hollowed out. Further, the magnification ratios or award amounts are displayed within the inner frame of the wheel; however, the magnification ratios or award amounts may be displayed within the outer or middle frame.

Also, the tool (also referred to as selecting means) for selecting the section of the wheel may be any one such as an arrow, ball, or lighting. The selecting means is not necessarily movable, and may select any of the sections on the wheel by, for example, rotating the wheel with respect to the fixed selecting means. The selecting means is not necessarily to be one in number, and a plurality of selecting means may be present. Accordingly, a plurality of sections may be selected with the plurality of selecting means. For example, two balls may be sequentially thrown into the wheel to select two sections. Alternatively, the wheel may be rotated to select two sections with two arrows being fixed. The respective selections by the plurality of selecting means may be made at the same time, or at different times.

Also, what is used in the roulette is not limited to the wheel, but may be in any form in place of the wheel. For example, in place of the wheel, anything having a triangular or rectangular shape may be used. Also, the number of wheels is not limited to one, but may be more than one. If the number of wheels is more than one, one section may be selected for each of the wheels, or a plurality of sections may be selected for each of the wheels. Further, the number of frames of the wheel is not limited, but may be any number. For example, the wheel may substantially consist of 4, 8, 16, 32, or 36 frames.

Figure 8:
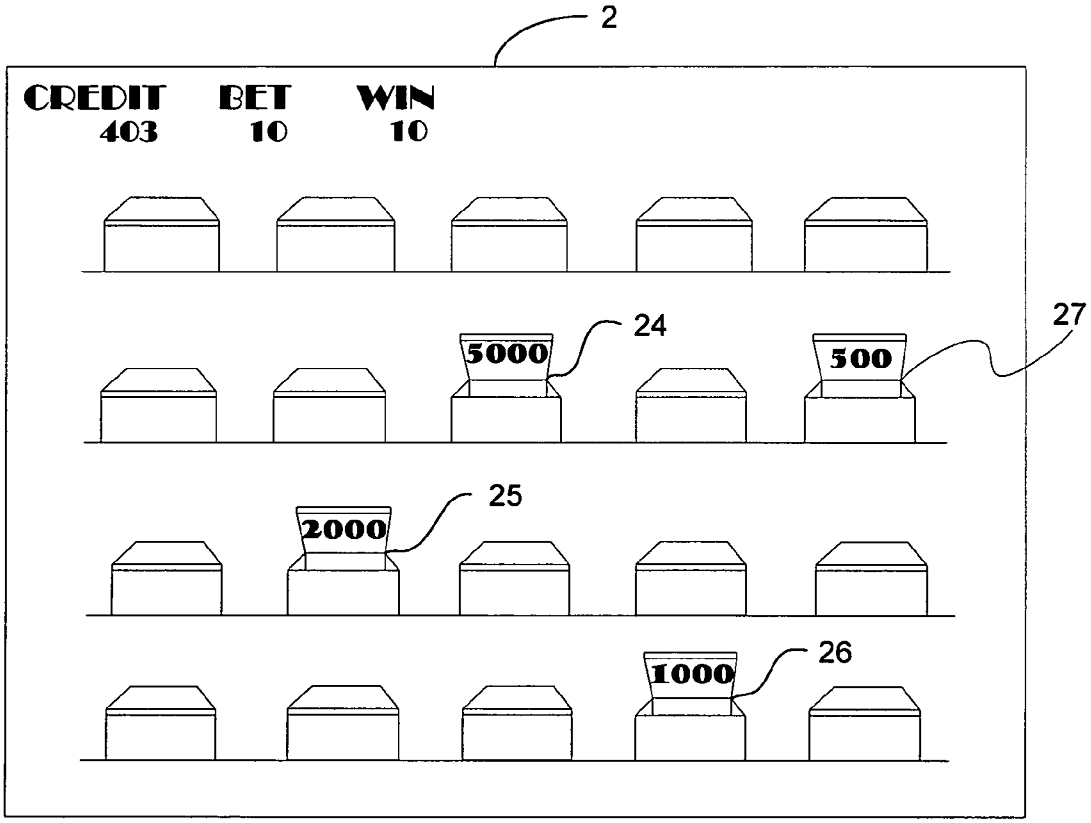
FIG. 8 is a diagram illustrating an example of a treasure box selection game of the present invention.
Figure 9:
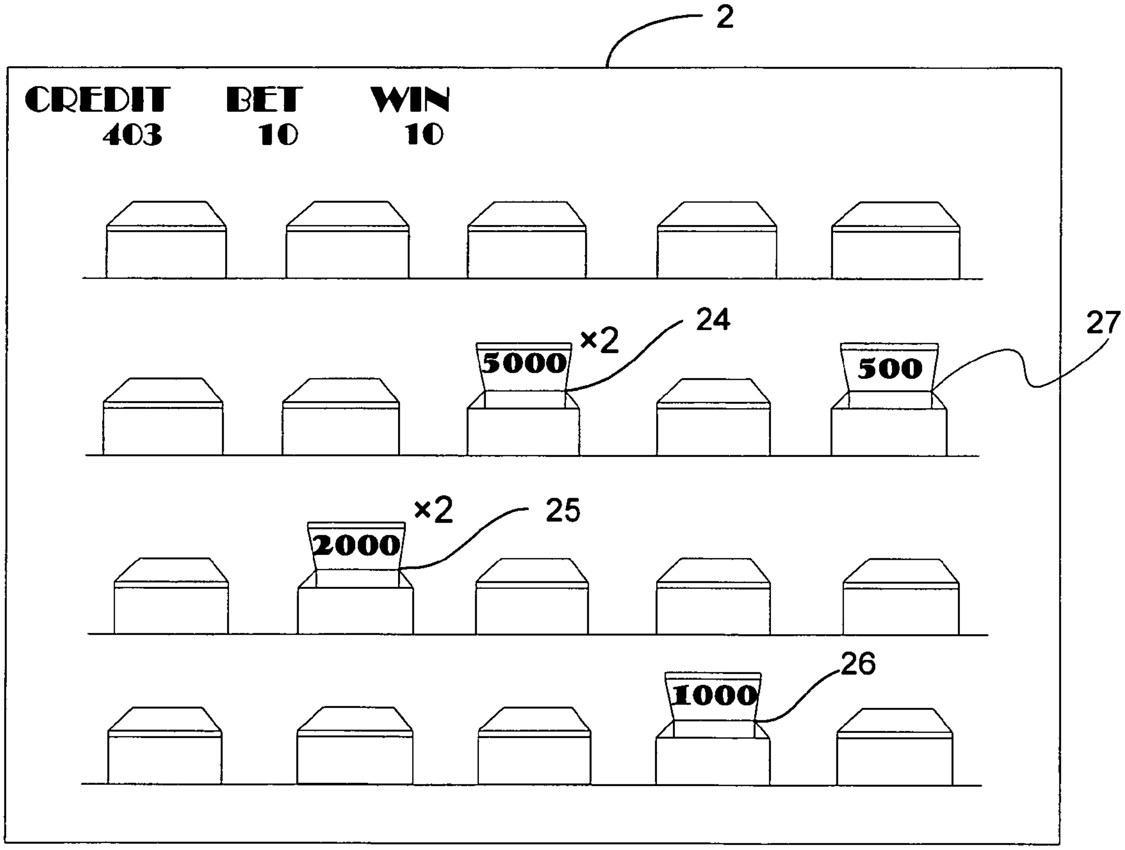
FIG. 9 is a diagram illustrating the example of a treasure box selection game of the present invention.

FIGS. 8 and 9 are diagrams illustrating an example of a treasure box selection game of the present invention. FIG. 8 illustrates the display screen 2. On the display screen2, a plurality of treasure boxes are displayed. Four of the treasure boxes (24 to 27) displayed on the display screen 2 are selected by the player to be brought into a state where award amount displays having been hidden in the respective treasure boxes are visible from outside. The player can win a total amount of the awards contained in the selected treasure boxes as a bonus. FIG. 8 illustrates a state where the treasure box selection game is played in a normal configuration, independently of the play history. On the other hand, FIG. 9 illustrates a state where the treasure box selection game is played after the play history has been analyzed and a result of the analysis has been applied to the game. In FIG. 9, the player selects four treasure boxes 24 to 27 similarly to the case of FIG. 8; however, the analysis result of the play history has been applied to the game, so that "×2" is displayed to the upper right of each of the treasure boxes 24 and 25 selected by the player, and the award amounts in the treasure boxes 24 and 25 the player can win are doubled. In FIG. 8, the total amount of awards the player won is "8500", whereas in FIG. 9, that is "15500".

The selection game of the present invention is not limited to the one described with FIGS. 8 and 9, but may be played in any configuration. For example, a method for changing the volatility of the game may be any one. For example, an award amount itself displayed from the object may be increased or decreased. For example, a total amount of awards the player can win may be increased or decreased. For example, the number of objects the player can select may be increased or decreased. For example, the number of objects itself displayed on the display may be increased or decreased. This makes it easy for the player to select a large or small amount of award; however, this is acceptable. For example, a value of the magnification ratio by which an award amount can be multiplied may be increased or decreased. For example, the number of magnification ratios by which award amounts can be respectively multiplied may be increased or decreased.

Also, for example, if the respective objects have different colors, a ratio in number of each of the colors may be changed. If some of the objects contain displays indicating that a secondary game such as a bonus game can be play or some symbols, the number of them may be changed. A change may be made such that two or more award amount displays, two or more magnification ratio displays, or the like, are provided from one object. Two or more of the above-described changes may be introduced in one play of the selection game. Such changes are not necessarily introduced at the same time, but may be introduced at different times. When the player selects an object, the award amount display, magnification ratio display, or the like may be provided in any manner. For example, some sort of display may be provided with the object being upside down. For example, some sort of display may be provided such that the object explodes and the some sort of display is only left.

Also, an object to be selected by the player is not the treasure box, but may be anything. For example, the object may be a picture of some sort of character, diamond, animal, household article, car, or the like. The number of objects (treasure boxes, etc.) may be any number. For example, the number of objects may be a small number such as three or five, or a large number such as twenty or thirty. The objects are not necessarily regularly arrayed in vertical and horizontal directions, but may be displayed in any form. For example, the objects may be disorderly or irregularly displayed. Also, a plurality of objects may be displayed inside some sort of shape such as a circular or star shape.

Also, what is displayed after the player has selected an object is not limited to the award amount or magnification ratio the player can win, but may be anything. For example, in place of the award amount, the magnification ratio, symbol, or the like may be displayed from the object, or for example, in place of the magnification ratio displayed to the upper right of the object, an award amount to be added to an award amount having been won by the player may be displayed. What (award amount, magnification ratio, symbol, etc.) is displayed in one play of the game is not necessarily of one type. For example, in one play of the game, the award amount may be displayed from some object, whereas from another object, the magnification ratio may be displayed.

Figure 10:
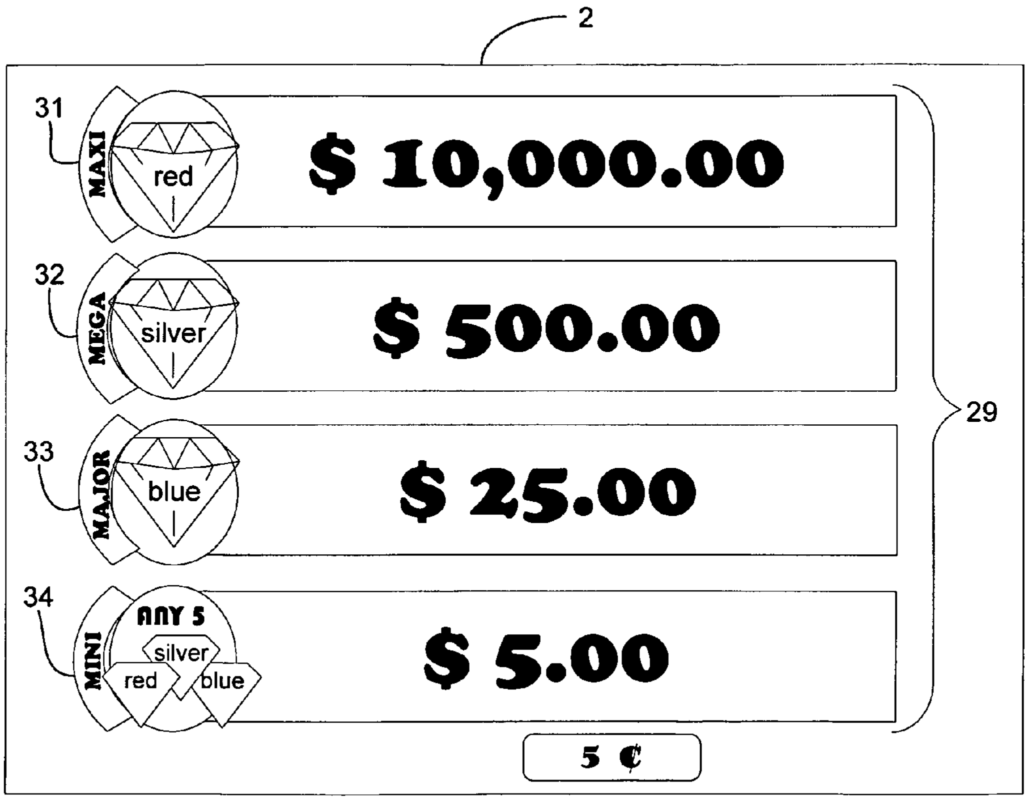
FIG. 10 is a diagram illustrating an example of a progressive game of the present invention.
Figure 11:
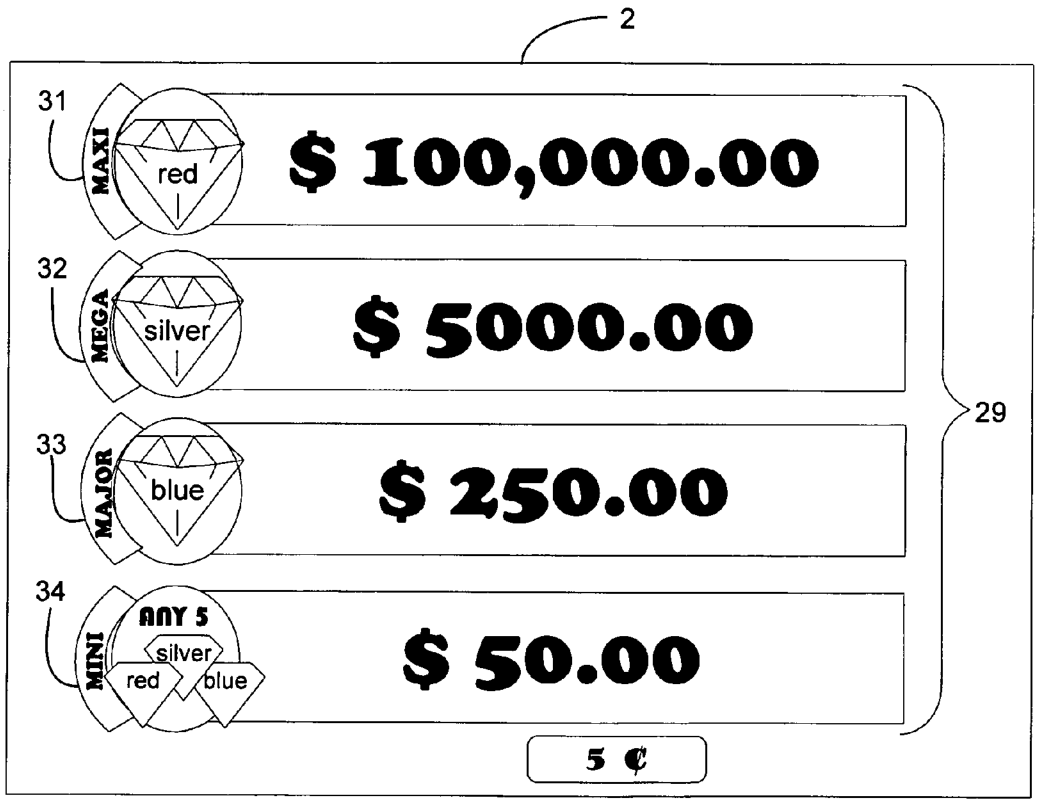
FIG. 11 is a diagram illustrating the example of a progressive game of the present invention.

FIGS. 10 and 11 are diagrams illustrating an example of a progressive game of the present invention. FIG. 10 illustrates a normal progressive game before an analysis result of the play history is applied. FIG. 10 illustrates the display screen 2. On the display screen 2, respective ranks 31 to 34 used in the progressive game, and award amounts 29 corresponding to the respective ranks are displayed. In the progressive game, a player plays some sort of game, and as a result of the game, the player can win any of the ranks 31 to 34. Then, the award amount corresponding to the rank having been won by the player is paid back to the player. FIG. 11 illustrates a display of the progressive game for a case where the analysis result of the play history has been applied to the progressive game. As can be seen from the comparison between FIGS. 10 and 11, in FIG. 11, the ward amounts indicated for the respective ranks 31 to 34 in FIG. 10 are increased by a factor of ten. In the case where the analysis result of the play history has been applied to the progressive game, the player can play the progressive game in the state illustrated in FIG. 11.

The progressive game of the present invention is not limited to the one described with FIGS. 10 and 11, but may be played in any configuration. For example, a method for changing the volatility of the progressive game may be any one. For example, a configuration for increasing the award amount may be any one. For example, the award amount is not increased using the magnification ratio of 10, but may be increased by a factor of any number, or by adding some award amount. On the other hand, the award amount may be decreased. For example, each of the ranks does not display the award amount, but may display the magnification ratio or the like, and the magnification ratio may be increased or decreased. A rate of the change of the magnification ratio may be any one. For example, the number of ranks or the number of rank types used in the progressive game may be increased or decreased. A rate of the change of the award amount, magnification ratio, or the like to be increased or decreased is not necessarily the same for the respective ranks, but may be different for each of the ranks. For example, the award amount, magnification ratio, or the like for some rank may be unchanged, but that for the other rank may exhibit an increase or the like. For example, a new rank having a display of "Next game" or the like indicating that a different type of game can be played may appear. Two or more of the above-described changes may be introduced in one play of the progressive game. Such changes are not necessarily introduced at the same time, but may be introduced at different times.

Also, for example, the number of ranks used in the progressive game may be any number. Further, the rank type is not "MAXI" or the like, but may be any one. The picture or the like representing the rank is not a diamond, but may be anything. Still further, the award amount is not in dollars, but may be in any monetary unit or nonmonetary unit.

Figure 12:
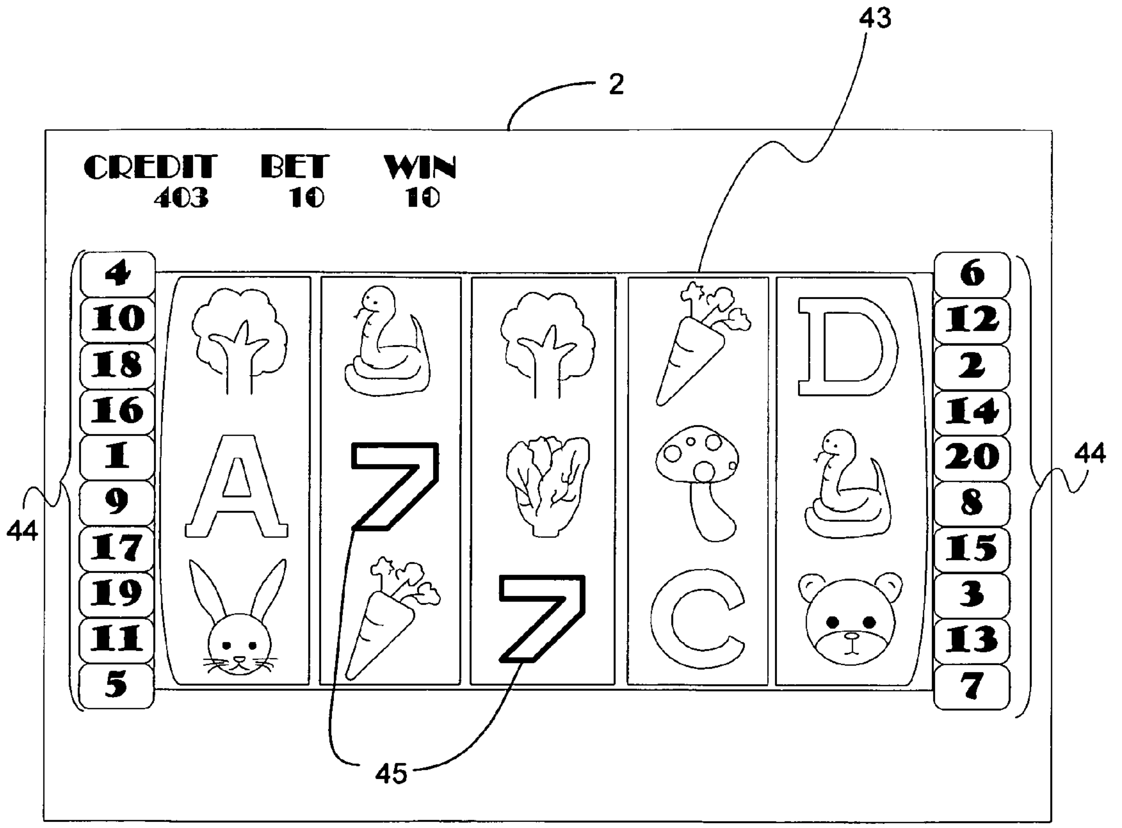
FIG. 12 is a diagram illustrating an example where a volatility of a slot game is changed.
Figure 13:
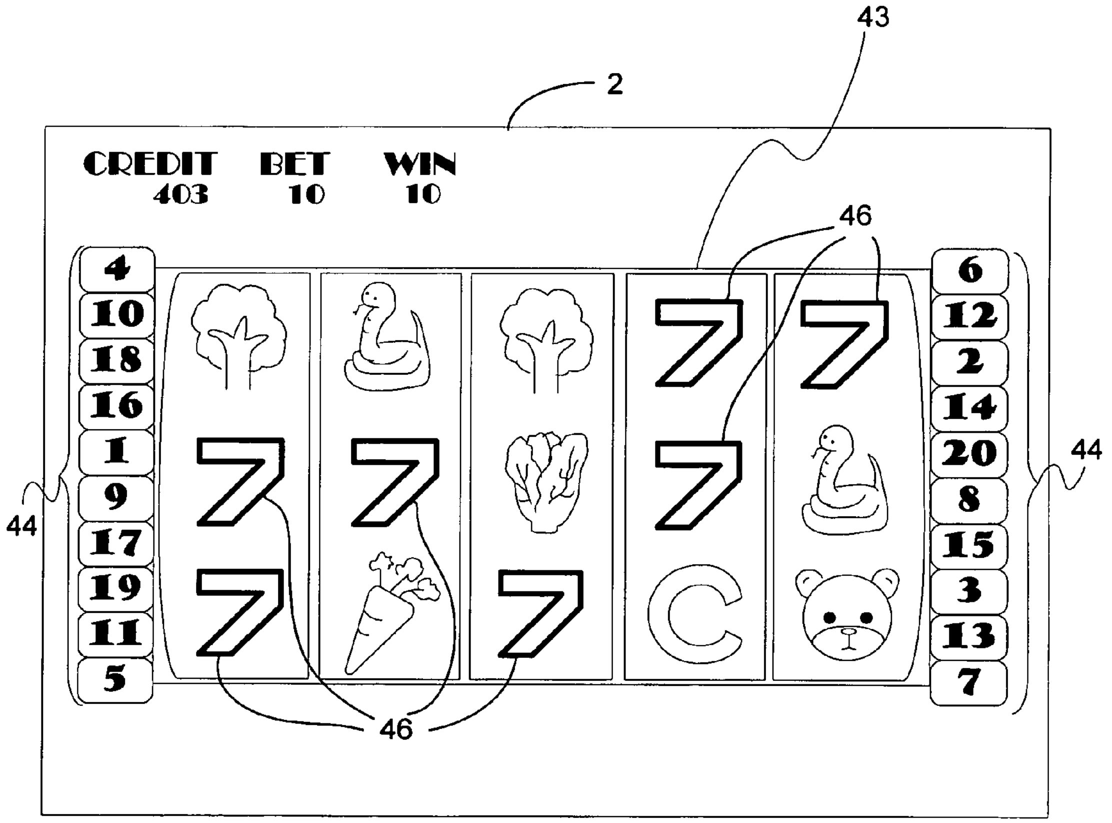
FIG. 13 is a diagram illustrating the example where a volatility of a slot game is changed.

FIGS. 12 and 13 are diagrams illustrating an example where the volatility of a slot game is changed. FIG. 12 illustrates a normal slot game before an analysis result of the play history is applied. In FIG. 12, the display screen 2 is illustrated. On the display screen 2, reels 43 and lines 44 are displayed. On the reels 43, a plurality of symbols are illustrated. In the slot game, if a winning combination consisting of symbols of a specific type is achieved on one of the lines 44 when the reels are stopped after rotation of the reels, the game moves to a bonus game, or an award is paid back. FIG. 12 illustrates a state where the reels are stopped, and two symbols "7" 45 of a specific type are respectively displayed on two of the reels. If an appearance rate of the specific symbol "7" is high, the winning combination is likely to be achieved on any of the lines, by which a winning percentage of a player may be increased, or an award amount the player can win may be increased.

FIG. 13 illustrates a state where the reels are stopped in the slot game applied with the analysis result of the play history. In FIG. 13, the volatility of the slot game is changed, and the appearance rate of the specific symbol "7" is increased. As a result, a large number of specific symbols "7" 46 are displayed on the reels. In this manner, a probability that the winning combination is achieved on any of the lines may be increased.

Figure 14:
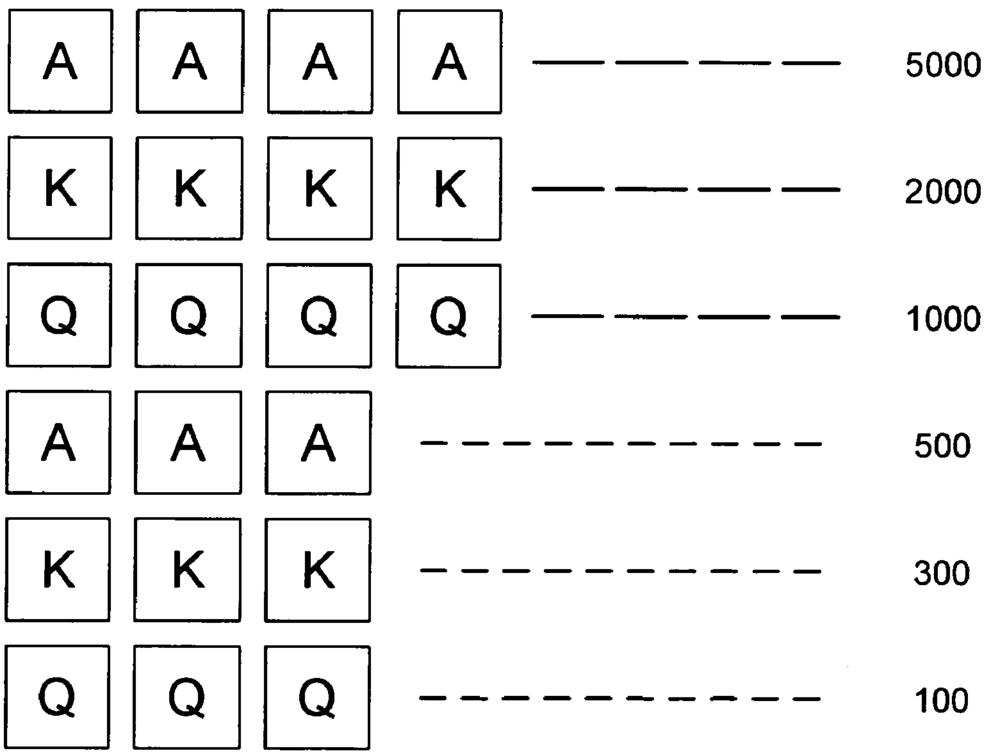
FIG. 14 is a diagram illustrating an example of winning combination types used in the slot game.
Figure 15:
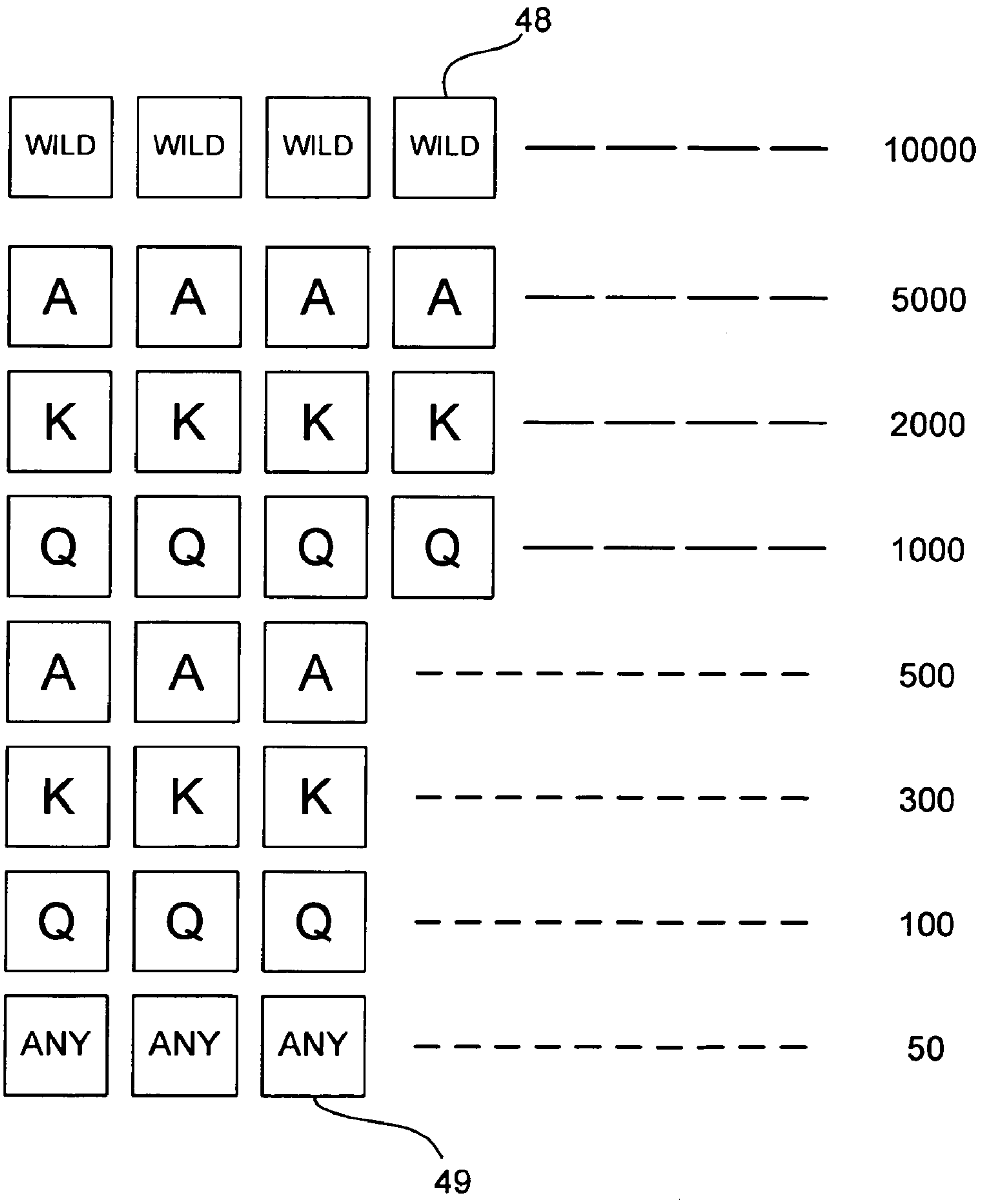
FIG. 15 is a diagram illustrating the example of winning combination types used in the slot game.

FIGS. 14 and 15 are diagrams illustrating an example of winning combination types used in the slot game. FIG. 14 illustrates normal winning combination types before the analysis result of the play history is applied, and six winning combination types are present. FIG. 15 illustrates winning combination types in the slot game after the analysis result of the play history has been applied, and as compared with FIG. 14, two winning combination types 48 and 49 are added. As described, by applying the analysis result of the play history, the number of winning combination types in the slot game may be increased to thereby change the volatility of the game.

The slot game of the present invention is not limited to the one described with FIGS. 12 to 15, but may be played in any configuration. For example, a method for changing the volatility of the slot game may be any one. For example, the number of frames for displaying the symbols on the reels may be increased or decreased to enable the reels to display a larger or smaller number of symbols. A direction in which the number of frames on the reels is increased or decreased may be any one, such as vertically, or horizontally, and for example, the number of frames may be six or more in the vertical direction, or four or more in the horizontal direction. The number of reels 43 may be increased or decreased, and also changed such that two reels are displayed on the display screen. For example, the number of lines may be increased or decreased to thereby achieve the winning combination on any of the lines with ease or difficulty, respectively. Also, an appearance probability of the winning combination may be increased or decreased. Further, the number of wining combination types may be increased or decreased. The number of symbols necessary to achieve the winning combination may be increased or decreased. An award amount to be paid back to the player upon achievement of the winning combination may be increased or decreased. The award amount corresponding to the winning combination may be changed into another element such as a magnification ratio. Two or more of the above-described changes may be introduced in one play of the slot game. Such changes are not necessarily introduced at the same time, but may be introduced at different times.

Also, for example, the winning combination is not limited. For example, the winning combination does not necessarily consist of symbols of the same type, but may consist of several types of symbols. To achieve the winning combination, symbols of the same type are not required to be present in all the frames on any of the lines, and a blank frame may be present on the line. The winning combination types are not limited to those illustrated in the diagrams, but may include any type. An award amount corresponding to the winning combination may be any amount, and in place of the award amount, a magnification ratio corresponding to the winning combination may be displayed. The number of symbols may be any number, and the symbol types may include any type. The specific symbol is not limited, and a plurality of types of specific symbols may be present. The number of lines may be any number. The line is not necessarily linear, but may be any line such as a zigzag or spiral line.

Figure 16:
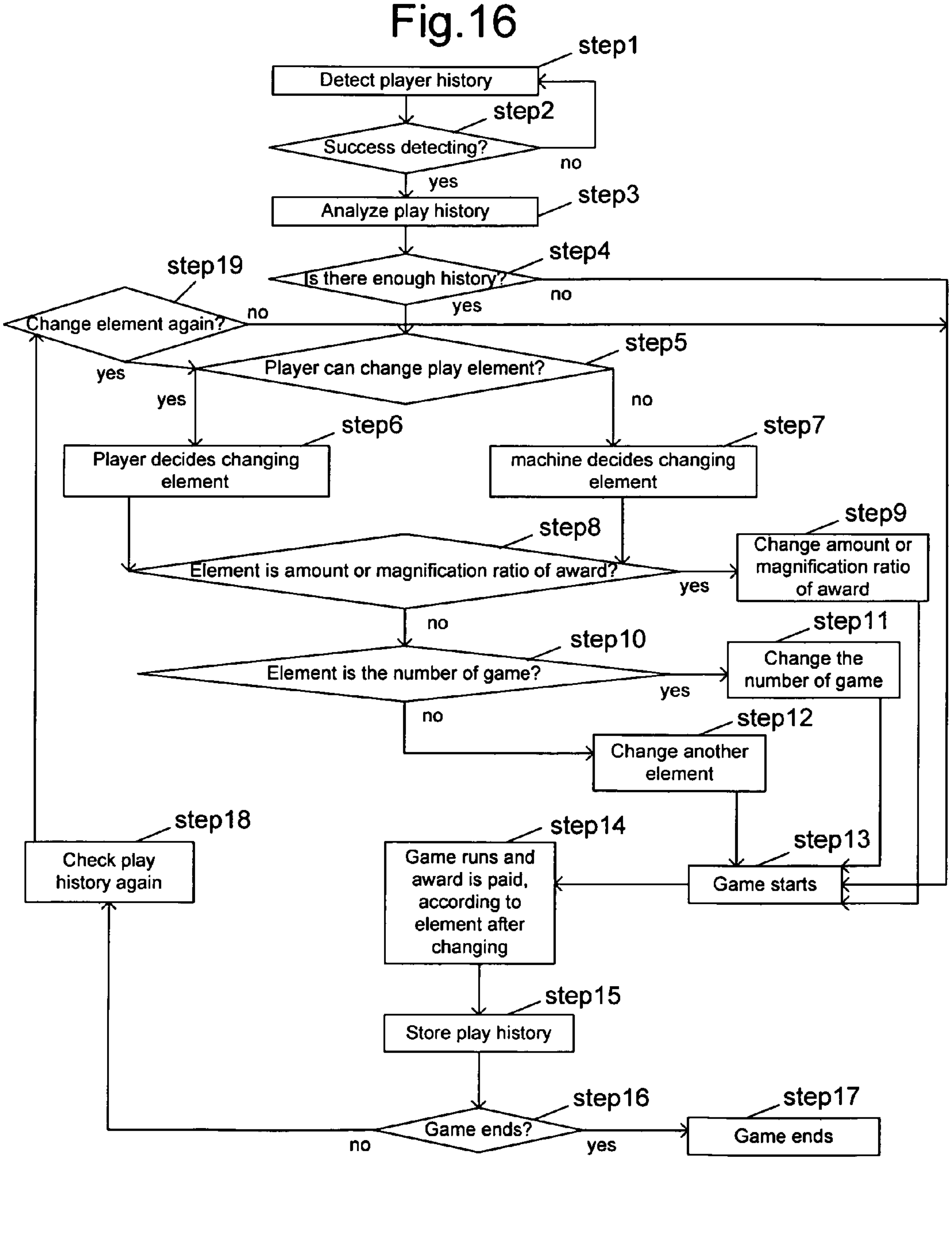
FIG. 16 is an example of a flowchart illustrating operations performed by the gaming machine of the present invention.

Next, operations performed by the gaming machine of the present invention are described on the basis of a flowchart. FIG. 16 is an example of the flowchart illustrating the operations performed by the gaming machine of the present invention. In the gaming machine of the present invention, a play history of a player is first detected (step 1). If the play history is successfully detected (step 2), the play history is analyzed (step 3). On the other hand, if the play history is not successfully detected, the play history is again detected (step 1). Then, in order to change a volatility of a game, it is determined whether or not the play history is enough (step 4). If it is determined that the play history is enough, it is determined whether or not the player can decide a volatility element to be changed in the game (step 5). If the player can decide it, the player decides the volatility element of the game to be changed (step 6). On the other hand, if the player cannot decide it, a device such as the gaming machine decides the volatility element of the game to be changed (step 7).

Subsequently, it is decided what the volatility element to be changed is. It is first determined whether or not a total amount of awards or a magnification ratio associated with each of the awards is changed (step 8). If the total amount of awards or the magnification ratio is changed, it is changed (step 9), and the game is started (step 13). If it is not changed, it is determined whether or not the number of plays of the game is changed (step 10). If the number of plays of the game is changed, it is changed (step 11), and the game is started (step 13). On the other hand, if the number of plays of the game is not changed, another element is changed (step 12), and the game is started (step 13). If the play history is not enough to change the volatility of the game (step 4), the game is started without changing the volatility of the game (step 13). Note that the volatility element capable of being changed may include any element, in addition to the above-described elements.

Subsequently, the game is played, and the award or the like is paid back on the basis of a given result of the play (step 14). Also, a play history arising from the play is further stored (step 15). After that, it is determined whether or not the game is ended (step 16). If the game is not ended, the play history including the newly stored play history is again analyzed (step 18). Then, it is determined whether or not the volatility of the game is again changed (step 19). If the volatility of the game is again changed, operations same as those described above are performed (steps 5 to 12), and then the game is started (step 13). If the volatility of the game is not changed again, the game is directly started without changing the volatility (step 13). On the other hand, it is determined in step 16 that the game is ended, the game is ended (step 17).

The operations of the gaming machine of the present invention are not limited to those illustrated in FIG. 16, but may be performed in any form. For example, if it is determined that the play history is enough to change the volatility of the game (step 4), step 8 may be directly performed to determine the volatility element to be changed, without performing the steps (steps 5 to 7) of determining whether the player or device decides the volatility element to be changed. Also, if the play history of the player is detected without performing the steps in steps 3 and 4, the volatility element to be changed may be directly decided (step 8).

As above, the present invention is specifically described with the use of the plurality of drawings and flow chart; however, it goes without saying that the present invention is not limited to such description, but as far as an embodiment has an essential part of the present invention, the embodiment falls within the scope of rights of the present invention even if it is embodied in any configuration. For example, the method for changing the volatility of the game is not limited to those described above, but the volatility of the game may be changed, for example, in point of being invisible to the player. Also, for example, elements visible to the player are not changed, but an award amount the player may win may be actually increased or decreased, or some sort of probability (player's winning percentage, magnification ratio, etc.) may be actually increased or decreased.

For example, in the roulette game, a configuration of the wheel visible to the player is not changed, but a probability that the selecting means selects a given place on the wheel may be increased or decreased. For example, in the object selection game, a configuration of the object visible to the player is not changed, but a probability that a larger or smaller award amount or magnification ratio is displayed from the object may be increased or decreased. For example, in the reel game, a configuration of the reel visible to the player is not changed, but a probability that the winning combination is achieved on any of the lines may be increased or decreased. Also, in the reel game, the configuration of the reel visible to the player is not changed, but a probability that the winning combination for paying back a larger or smaller award amount is achieved on any of the lines may be increased or decreased.

The above description is given on the roulette game, object selection game, reel game, and the like; however, the present invention is not limited to these games, but may be in any game configuration. For example, the present invention may be a card game such as blackjack or poker, an action type fighting game, or the like. Also, the present invention may be any game having a combination of such various types of game configurations.

What is claimed is:

1. A gaming machine for playing a game and paying out an award according to play results, comprising:

a detector, which recognizes a play history of a player;

an analyzer, which analyzes the play history;

a controller, which enables changing of a volatility of the game by the player, based on the play history;

an initiator, which is enabled to initiate the game with changed volatility; and a display having a touch screen function for the player to select a volatility element for changing the volatility of the game by touching the volatility element displayed on a screen of the display, wherein the controller is configured to, after the analyzer has analyzed the play history, allow the player to select the volatility element for changing the volatility of the game via the touch screen function of the display and allows the initiator to start the game with changed volatility only when the analyzer determines an amount in the play history exceeds a predetermined threshold required to allow the player to change the volatility.

2. The gaming machine of claim 1, wherein the initiator initiates the game without changing the volatility when the controller does not receive any input regarding selection of the volatility element via the touch screen function of the display from the player.

3. The gaming machine of claim 1, wherein the changed volatility includes a changed total amount of awards.

4. The gaming machine of claim 3, wherein the changed volatility includes a changed magnification ratio associated with each of the awards.

5. The gaming machine of claim 1, wherein the changed volatility includes a changed number of plays of the game.

6. The gaming machine of claim 1, wherein the play history arising from the play is further stored into a memory communicating with the detector.

7. The gaming machine of claim 6, wherein the play history including the newly stored play history is again analyzed by the analyzer.

8. The gaming machine of claim 1, wherein the initiator initiates the game without changing the volatility only when the amount of the play history does not exceed the predetermined threshold required to allow the player to change the volatility.

9. A gaming machine for playing a game and paying out an award according to play results, comprising:

a detector, which recognizes a play history of a player;

an analyzer, which analyzes the play history;

a controller, which enables changing of a volatility of the game by the player, based on the play history;

an initiator, which is enabled to initiate the game with changed volatility; and an input device for allowing the player to select a volatility element for changing the volatility of the game, wherein the controller is configured to, after analyzing the play history, allow the player to select the volatility element of the game via the input device and allows the initiator to start the game with changed volatility only when the analyzer determines an amount in the play history exceeds a predetermined threshold required to allow the player to change the volatility.

10. The gaming machine of claim 9, wherein the initiator initiates the game without changing the volatility when the controller does not receive any input via the input device regarding selection of the volatility element via the input device for selecting the volatility element from the player.

11. The gaming machine of claim 9, wherein the changed volatility includes a changed total amount of awards.

12. The gaming machine of claim 11, wherein the changed volatility includes a changed magnification ratio associated with each of the awards.

13. The gaming machine of claim 9, wherein the changed volatility includes a changed number of plays of the game.

14. The gaming machine of claim 9, wherein the play history arising from the play is further stored into a memory communicating with the detector.

15. The gaming machine of claim 14 wherein the play history including the newly stored play history is again analyzed by the analyzer.

16. The gaming machine of claim 9, wherein the initiator initiates the game without changing the volatility only when the amount of the play history does not exceed the predetermined threshold required to allow the player to change the volatility.

* * * * *